(12) United States Patent
Murakami

(10) Patent No.: US 6,760,853 B2
(45) Date of Patent: Jul. 6, 2004

(54) POWER SHUTOFF METHOD FOR TCP/IP NETWORK DEVICE AND RECORDING MEDIUM RECORDING THE PROGRAM THEREFOR

(75) Inventor: Takuya Murakami, Tokyo (JP)

(73) Assignee: NEC Corporation, Tokyo (JP)

(*) Notice: Subject to any disclaimer, the term of this patent is extended or adjusted under 35 U.S.C. 154(b) by 654 days.

(21) Appl. No.: 09/726,311

(22) Filed: Dec. 1, 2000

(65) Prior Publication Data

US 2001/0003164 A1 Jun. 7, 2001

(30) Foreign Application Priority Data

Dec. 3, 1999 (JP) .............................. 11-345343

(51) Int. Cl.[7] .................................................. G06F 1/26
(52) U.S. Cl. .......................... 713/330; 713/320; 713/324
(58) Field of Search ................................ 713/300, 310, 713/320, 323, 324, 330

(56) References Cited

U.S. PATENT DOCUMENTS 5,949,974 A * 9/1999 Ewing et al. ............... 709/202
6,052,565 A * 4/2000 Ishikura et al. ........... 455/67.11
6,425,040 B1 * 7/2002 Dewa et al. ................. 710/303

FOREIGN PATENT DOCUMENTS

| JP | A 62-86401 | 4/1987 |
| JP | A 2-42842 | 2/1990 |
| JP | A 10-69446 | 3/1998 |
| JP | 10-69446 | 3/1998 |
| JP | 11-55354 | 2/1999 |
| JP | 11-110089 | 4/1999 |

* cited by examiner

Primary Examiner—Dennis M. Butler
(74) Attorney, Agent, or Firm—Young & Thompson

(57) ABSTRACT

According to the power shutoff method for the TCP/IP network device, the connection status of the terminal connected to the TCP/IP network is monitored, whether the power can be shut off or not is judged based on the result of the monitoring, and the power for the terminal is shut off when it is judged acceptable to shut off the power in the judgment step.

10 Claims, 3 Drawing Sheets

POWER SHUTOFF METHOD FOR TCP/IP NETWORK DEVICE AND RECORDING MEDIUM RECORDING THE PROGRAM THEREFOR

BACKGROUNDS OF THE INVENTION

1. Field of the Invention

The present invention relates to a power shutoff method to control shutoff of the power for the terminal connected to the TCP/IP network and to a recording medium recording the program therefor.

2. Description of the Related Art

With recent diffusion of the Internet, many people desire to access the Internet from portable terminals such as handy phones and PDAs to enjoy services such as E-mails and WWW. There are some ways to connect the Internet from a portable terminal. One of them is a direct connection method to have a TCP/IP protocol stack in the portable terminal for direct connection to the Internet.

Since the portable terminal is usually driven by batteries, it is necessary to minimize the consumption power to extend the operation hours. The power is shut off while the terminal is not in use, but it is preferable to maintain the connection with the server even though the power is temporarily shut off.

When the TCP is used, however, TCP may send and receive data even while the application software is not making any data communications. If the power is shut off during such period, the connection with the server may be lost. To solve this problem, a protocol converter called "gateway" has been conventionally used for connection with the Internet from a portable terminal. According to the Japanese Patent Application Laid-open (Kokai) No. Heisei 10-69446, for example, a device called the front end box serves as a relay for restart after power shutoff.

However, the conventional invention above had a drawback that the use of the gateway makes the entire system expensive and also makes its control complicated.

SUMMARY OF THE INVENTION

The present invention has been made under the circumstances above. It is an object of the present invention to provide, when the TCP/IP is directly incorporated to the portable terminal, a method to shut off the power without the need of gateway and with maintaining the connection with the server as well as to provide a recording medium containing the program therefor.

According to one aspect of the invention, a power shutoff method for the TCP/IP network device comprising the steps of a step to monitor the connection status of the terminal connected to the TCP/IP network and judge whether the power for the terminal can be shut off according to the result of the monitoring, and a step to shut off the power for the terminal when it is judged acceptable to shut off the power in the judgment step.

Thus, according to the present invention, whether the power of the terminal can be shut off or not is judged based on the connection status of the terminal connected to the TCP/IP network and, when it is judged possible, the power for the terminal is shut off.

In the preferred construction, a power shutoff method for the TCP/IP network device further comprises a step to provide a power shutoff permit notice to the terminal when the power shutoff for the terminal is judged acceptable, and a step to shut off the power for the terminal upon receipt of the power shutoff permit notice.

In another preferred construction, the power shutoff is judged acceptable in the judgment step when the connection status satisfies all of these conditions:

TCP send buffer is empty;
Delayed ACK is not in operation; and
TCP status is not any of SYN_RCVD, SYN_SENT, LAST_ACK, FIN_WAIT_1 and CLOSING.

In another preferred construction, the connection status of the terminal connected to the TCP/IP network is monitored all the time and the judgment step is executed all the time.

In another preferred construction, the judgment step is executed only when the power shutoff is requested by the application of the terminal.

In another preferred construction, the terminal is a portable terminal.

According to another aspect of the invention, a computer readable memory storing the program which controls the computer and shuts off the power for the TCP/IP network device, the program monitoring the connection status of the terminal connected to the TCP/IP network and judging whether the power for the terminal can be shut off according to the result of the monitoring, and executing the power shutoff for the terminal when it is judged acceptable to shut off the power in the judgment step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The power shutoff method of the TCP/IP network device according to the present invention enables temporary power shutoff with maintaining the TCP connection of the network device using the TCP/IP. By this method, the power consumption of the device while the network is not used can be minimized.

To secure the data distribution, TCP makes internal operations, which are invisible from the application software. For example, data sending is necessarily followed by the acknowledgement (ACK) from the other (receiving) party, but this operation is processed inside of TCP and is not visible from the application software. Connection processing and disconnection processing at TCP also involve some data communications inside. Power shutoff during such communications results in abnormal end at the other party.

In contrast, according to the method of this embodiment, the device is always monitoring the TCP status to maintain the TCP connection. When the TCP becomes free from any data communications inside as described above, the device issues a notice to allow power shutoff to the application. Thus, the device power can be safely shut off without losing the TCP connection.

Figure 1:
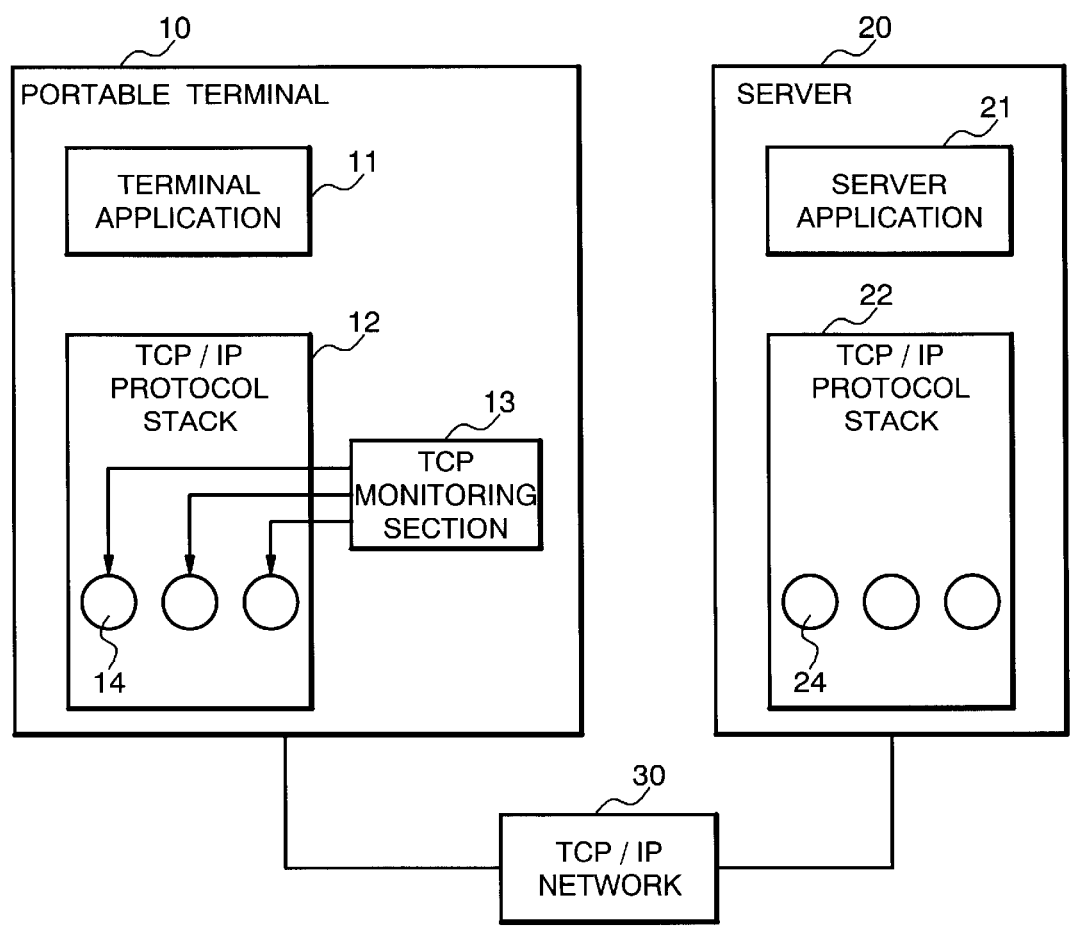
FIG. 1 is a block diagram showing an example of the portable communication system to which the power shutoff method according to an embodiment of the present invention is applied.

FIG. 1 shows a block diagram showing an example of the portable communication system to which the power shutoff method according to a first embodiment is applied.

A portable terminal 10 is connected to a server 20 via a TCP/IP network 30. A terminal application 11 running on the portable terminal 10 uses a TCP/IP protocol stack 12 to communicate with a server application 21 running on the server 20.

The TCP/IP protocol stack 12 can control several connections 14. A TCP monitoring section 13 is the software to monitor these connections 14.

Figure 2:
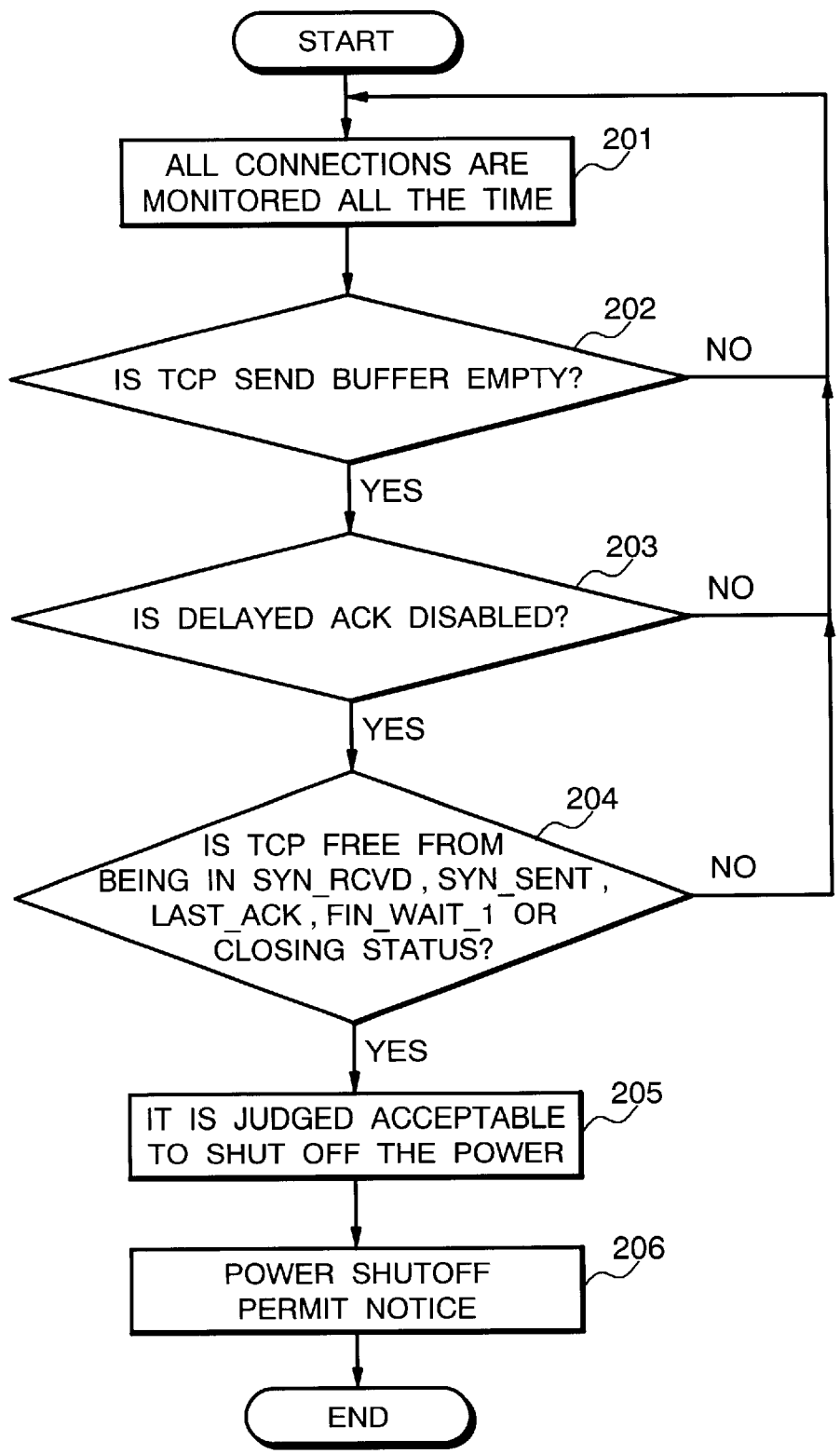
FIG. 2 is a flowchart showing the operation of the first embodiment of the present invention.

Referring to the flowchart of FIG. 2, the operation of the first embodiment having the configuration as described above will be explained below.

The TCP monitoring section 13 is always monitoring all of the connections 14 in operation within the TCP/IP protocol (Step 201). It judges whether all connections are in the "Power shutoff acceptable status" (Step 205). After all connections are judged to be in the "Power shutoff acceptable status", it provides a power shutoff permit notice to the terminal application 11 to allow power shutoff (Step 206).

At Step 205, whether a connection is in the "Power shutoff acceptable status" or not is judged by checking whether the connection satisfies all of these three conditions below.

1) TCP Send Buffer is Empty (Step 202)

When the application sends data, the TCP once stores the data in the TCP's send buffer and makes sending. Then, when it receives acknowledgement (ACK) from the other (receiving) party, it deletes the data stored in the send buffer.

Therefore, if the TCP send buffer is empty, no acknowledgement will be sent from the receiving party. In this case, the power can be shut off.

2) Delayed ACK is Not in Operation (Step 203)

Upon receipt of data from the sending party, the TCP always sends back the acknowledgement. If it does not send back the acknowledgement, the other (sending) party, which is not notified of the receipt of data, will send the data again.

To prevent excessive acknowledgement sending, the TCP sometimes delays sending of the acknowledgement. This is called "Delayed ACK". If the power is shut off while this mechanism is working, the acknowledgement is not sent and the sending party sends the data again, which finally results in loss of connection.

Thus, the power can be shut off when the delayed ACK is not in operation.

3) The TCP Status is Not SYN_RCVD, SYN_SENT, LAST_ACK, FIN_WAIT_1 or CLOSING (Step 204).

For the TCP connection, there are 11 statuses: CLOSED, LISTEN, SYN_RCVD, SYN_SENT, ESTABLISHED, TIME_WAIT.

Out of these, five statuses (SYN_RCVD, SYN_SENT, LAST_ACK, FIN_WAIT_1 and CLOSING) are waiting for acknowledgement from the other party. If the power is shut off in these statuses, the TCP cannot receive the acknowledgement from the other party and cannot maintain the connection.

If all of these three conditions are satisfied, the power can be shut off. Upon receipt of the power shutoff permit notice to allow power shutoff from the TCP monitoring section 13, the terminal application 11 shuts down the power.

Then, another embodiment of the present invention will be described below.

The specific configuration is not limited to the one described in the above embodiment and it can be modified without departing from the scope and spirit of the present invention.

In the first embodiment, for example, the TCP monitoring section 13 is always monitoring the TCP/IP and provides a notice to the terminal application 11 when the power shutoff becomes possible. Oppositely, however, the system can be designed so that, when the terminal application 11 desires power shutoff, it inquires the TCP monitoring section 13 whether the power can be shut off and the TCP/IP is monitored at such timings. According to this method, it is not necessary to monitor the TCP/IP all the time.

Figure 3:
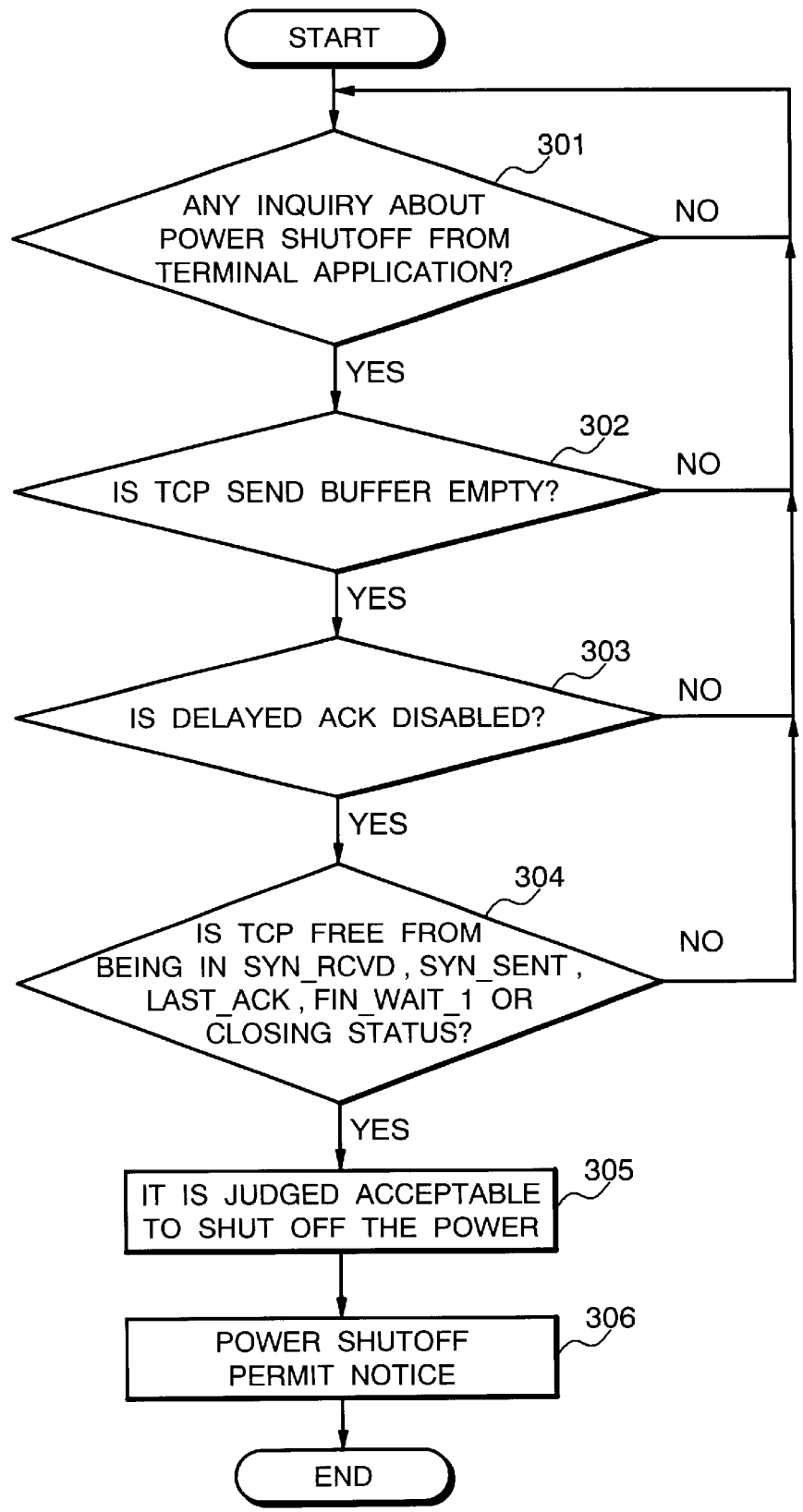
FIG. 3 is a flowchart showing the operation of another embodiment of the present invention.

The flowchart of FIG. 3 shows the operation of the above embodiment in which the terminal application 11 makes inquiry to the TCP monitoring section 13, when power shutoff is desired, to see whether the power can be shut off. As shown in the figure, the TCP monitoring section 13 here makes judgment whether the power can be shut off when the terminal application 11 inquires about the possibility of power shutoff (Step 301). The processes from Step 302 to Step 306 are the same as those from Step 202 to 206 in FIG. 2 and the explanation for them is omitted.

The above embodiment shows the method to minimize the power consumption of the portable terminal 10 by incorporating the TCP monitoring in the portable terminal 10. This method can be used in all TCP/IP network devices using the TCP.

The power shutoff method for the TCP/IP network device according to the present invention can be achieved by hardware, of course, but it can be also achieved by computer programs having the applicable functions loaded to the memory in the computer processor. Such computer programs are stored in the magnetic disk, semiconductor memory or other recording medium. Loaded to the computer processor from the recording medium, such programs achieve the functions described above by controlling the operation of the computer processor.

According to the present invention, the power consumption of the device can be minimized by shutting down the power for the device with maintaining the TCP connection. This becomes possible because the power can be shut off with maintaining the TCP connection by monitoring of the TCP connection status for all the time and checking to see whether or not the power can be shut off.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A power shutoff method for a TCP/IP network device comprising the steps of:
    a step to monitor a connection status of a terminal connected to a TCP/IP network and judge whether power for said terminal can be shut off according to a result of said monitoring; and
    a step to shut off the power for said terminal when it is judged acceptable to shut off the power in said judgment step, wherein
    the power shutoff is judged acceptable in said judgment step
    when said connection status satisfies all of these conditions:
        TCP send buffer is empty;
        Delayed ACK is not in operation; and
        TCP status is not any of SYN_RCVD, SYN_SENT, LAST_ACK, FIN_WAIT_1 and CLOSING.

2. A power shutoff method for the TCP/IP network device as set forth in claim 1 further comprising:
    a step to provide a power shutoff permit notice to said terminal when the power shutoff for said terminal is judged acceptable, and
    a step to shut off the power for said terminal upon receipt of said power shutoff permit notice.

3. A power shutoff method for the TCP/IP network device as set forth in claim 1, wherein
    the connection status of the terminal connected to the TCP/IP network is monitored all the time and said judgment step is executed all the time.

4. A power shutoff method for the TCP/IP network device as set forth in claim 1, wherein
    said judgment step is executed only when the power shutoff is requested by the application of said terminal.

5. A power shutoff method for the TCP/IP network device as set forth in claim 1, wherein
    said terminal is a portable terminal.

6. A computer readable memory storing a program which controls the computer and shuts off the power for a TCP/IP network device,
    a program
    monitoring a connection status of a terminal connected to a TCP/IP network and judging whether power for said terminal can be shut off according to a result of said monitoring, and
    executing the power shutoff for said terminal when it is judged acceptable to shut off the power in said judgment step, wherein
    said program judges it acceptable to shut off the power when said connection status satisfies all of these conditions:
        TCP send buffer is empty;
        Delayed ACK is not in operation; and
        TCP status is not any of SYN_RCVD, SYN_SENT, LAST_ACK, FIN_WAIT_1 and CLOSING.

7. A computer readable memory storing the program for power shutoff processing of the TCP/IP network device as set forth in claim 6, wherein
    said program provides a power shutoff permit notice to said terminal when it is judged acceptable to shut off the power for said terminal and
    the power shutoff processing is executed for said terminal upon receipt of said power shutoff permit notice.

8. A computer readable memory storing the program for power shutoff processing of the TCP/IP network device as set forth in claim 6, wherein
    the connection status of the terminal connected to the TCP/IP network is monitored all the time and said judgment step is executed all the time.

9. A computer readable memory storing the program for power shutoff processing of the TCP/IP network device as set forth in claim 6, wherein
    said judgment step is executed only when the power shutoff is requested by the application of said terminal.

10. A computer readable memory storing the program for power shutoff processing of the TCP/IP network device as set forth in claim 6, wherein
    said terminal is a portable terminal.

* * * * *